No. 704,696. Patented July 15, 1902.
J. L. CREVELING.
MEANS FOR REGULATING THE OUTPUT OF DYNAMO ELECTRIC MACHINES.
(Application filed June 12, 1901.)
(No Model.)
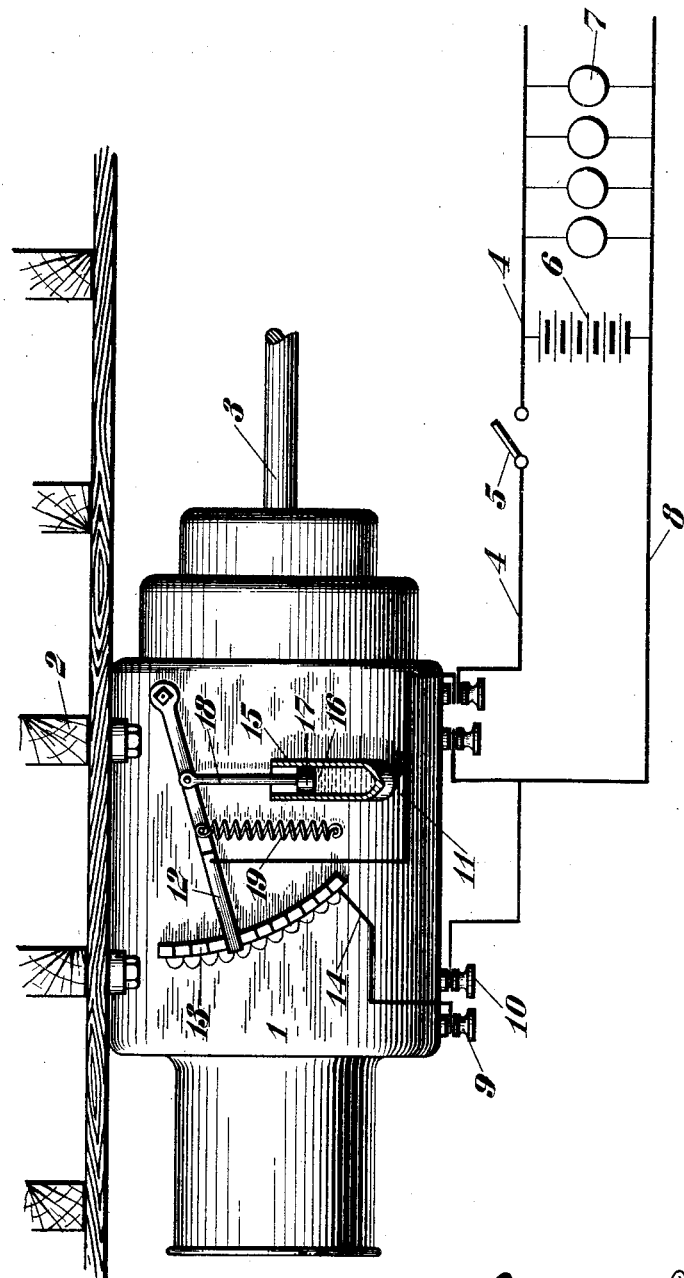

UNITED STATES PATENT OFFICE.

JOHN L. CREVELING, OF NEW YORK, N. Y.

MEANS FOR REGULATING THE OUTPUT OF DYNAMO-ELECTRIC MACHINES.

SPECIFICATION forming part of Letters Patent No. 704,696, dated July 15, 1902.

Application filed June 12, 1901. Serial No. 64,200. (No model.)

*To all whom it may concern:*

Be it known that I, JOHN L. CREVELING, a citizen of the United States, residing at New York, State of New York, have invented certain new and useful Improvements in Means for Regulating the Output of Dynamo-Electric Machines, of which the following is a specification.

My invention relates to means for regulating the output of a dynamo-electric machine, and has for its object to effect the regulation of the output directly by the heat produced in the machine.

My invention is particularly applicable to small machines, and as it has special reference to car-lighting the invention will be described with reference to car-lighting, it being understood that I do not thereby limit my invention thereto.

In the accompanying drawing I have shown in a diagram a dynamo-electric machine and a lighting system wherein my invention is embodied.

In systems of car-lighting in which a generator is used located beneath the floor of the car and deriving its power from the car-axle it is of course necessary to employ as small a machine as possible, which naturally means that the generator will be required to work very close to its heating limit, and consequently it is advantageous that the output of the machine under certain conditions should be made a function of its temperature.

In the drawing, 1 indicates a suitable generator suspended beneath the body of the car 2. This generator is provided with an armature-shaft 3, which for the purposes of this specification we will consider as revolving in one direction only, regardless of the movement of the train. The generator is shown as an ordinary shunt-machine. The positive lead 4 of the generator is carried to the switch 5, which may be of any of the well-known types adapted to close the circuit when the voltage of the generator shall have reached a predetermined degree. A continuation of this lead communicates with the positive pole of the storage battery 6 and with one of the terminals of each of the lamps or other translating device, as indicated at 7. The main 8 leads from the negative pole of the generator and is connected to the storage battery 6 and the translating device 7. The binding-posts 9 10 are each connected to one end of the field exciting-coil. A wire 11 connects the positive pole of the generator with the end of the pivoted switch-lever 12, which is adapted to switch across the contacts of the resistance 13. A wire 14 leads to the binding-post 9, connected to one end of the field-coil, so that the said field-coil is placed in shunt to the mains of the machine through the switch and resistance, so that the position of the lever 12 determines the amount of external resistance inserted in the field exciting-circuit.

Mounted on the generator-case and communicating with the interior thereof is a tube 15, which is filled with mercury to the level 16. The tube is obviously made of a material having a low coefficient of expansion. A float or plunger 17 rests upon the mercury and is connected by a rod 18 with the lever 12. A spring 19 normally tends to draw the lever 12 downward and to cut out the resistance 13. The expansion of the mercury under the influence of the heat, which expansion is therefore a function of the temperature of the machine, will determine the position of the lever 12, and consequently the degree of field excitation. It is obvious that in order to obtain a greater range of movement the switch-arm may be geared to the float or plunger by a multiplying-gear.

It will be understood that any suitable means may be employed to maintain the current uniform for variations of speed; but they are in the present instance omitted for the sake of clearness, as devices made in accordance with the present invention may work in combination with any current-regulating means suitable for the purpose.

In addition to its other functions the device forming the subject-matter of this invention also protects the shunt-field from being burned out in case the main should be broken or the main circuit left open, when of course the current-regulating device if magnetic might fail to act, leaving the shunt-coil across the brushes of the generator with no load, when course its voltage would be above the normal and considerable danger of burning out the field would exist.

The operation of the device is substantially as follows: If we suppose that the car has been lying for some time in the yard, the generator of course would have become cooled to practically the atmospheric temperature, and of course during this time the batteries have not been charging, and in order to maintain the lights at the proper brilliancy it is desirable that the maximum current should be delivered as soon as possible. This maximum current will be given out until the temperature of the generator shall rise, due to the heat waste both in the armature and the field, until expansion of the mercury shall cause resistance to be inserted in the exciting-circuit and lessen the output, thus decreasing the heat waste both in the armature and the field. It is obvious that during this time while the generator is warming up it might be worked to give a far greater output than it could be operated for any long interval of time and will take care of itself if used for a longer period. It is obvious also that a greater output is desirable during the night than during the day, and as the atmospheric temperature is much lower at night than during the day the night output of the generator will be in excess of the day output, and as much more light is required during the winter than during the summer the generator would tend to work at its maximum in either case and might be so arranged as to supply considerably more current in the winter than in the summer.

Having described my invention and one mode of carrying the same into operation, I declare that what I claim, and desire to secure by Letters Patent, is—

1. A dynamo-electric machine combined with means for regulating its output comprised in part by a heat-influenced element in heat-receiving relation with the machine.

2. An electric generator combined with regulating means therefor, comprised in part by a movable element and means for moving said element under the influence of heat developed in operating the machine.

3. A dynamo-electric machine combined with a regulating device therefor, comprised in part by means for regulating the degree of field excitation by the degree of heat developed by the machine.

4. A shunt-wound dynamo combined with means for regulating the shunt-field by heat developed in the machine.

5. A generator provided with a heat-operated regulator in heat-conducting communication with the machine.

6. A generator combined with a heat-operated regulating-switch whose extent of operation is a function of the heat developed in the operation of the machine.

7. A dynamo-electric-machine regulator comprising a variable resistance in circuit with the machine and means for varying the resistance by the degree of heat developed in the operation of the machine.

In testimony whereof I have signed my name to this specification, in the presence of two subscribing witnesses, this 6th day of June, 1901.

JOHN L. CREVELING.

Witnesses:
H. C. HUNTER,
GEO. E. MORSE.